United States Patent [19]

Sprague et al.

[11] Patent Number: 5,422,816
[45] Date of Patent: Jun. 6, 1995

[54] PORTABLE PERSONAL NAVIGATION TRACKING SYSTEM

[75] Inventors: David S. Sprague, Portola Valley; Arthur Woo, Cupertino, both of Calif.

[73] Assignee: Trimble Navigation Limited, Sunnyvale, Calif.

[21] Appl. No.: 199,726

[22] Filed: Feb. 22, 1994

[51] Int. Cl.[6] .................. G06F 165/00; H04B 1/44
[52] U.S. Cl. .................. 364/449; 364/448; 342/357; 455/89
[58] Field of Search .......... 364/448, 449, 460; 342/357, 450, 457; 340/989, 990, 993, 995; 455/73, 89, 74

[56] References Cited

U.S. PATENT DOCUMENTS

| | | | |
|---|---|---|---|
| 4,804,937 | 2/1989 | Barbiaux et al. | 340/52 F |
| 4,897,642 | 1/1990 | DiLullo et al. | 340/825.060 |
| 5,043,736 | 8/1991 | Darnell et al. | 342/357 |
| 5,046,130 | 9/1991 | Hall et al. | 455/78 |
| 5,153,836 | 10/1992 | Fraughton et al. | 364/461 |
| 5,155,689 | 10/1992 | Wortham | 364/460 |
| 5,223,844 | 6/1993 | Mansell et al. | 342/357 |
| 5,278,568 | 1/1994 | Enge et al. | 342/367 |
| 5,317,321 | 5/1994 | Sass | 342/176 |
| 5,334,974 | 8/1994 | Simms et al. | 340/990 |

*Primary Examiner*—Michael Zanelli
*Attorney, Agent, or Firm*—Thomas E. Schatzel

[57] ABSTRACT

A data/voice modem embodiment of the present invention comprises an asynchronous-to-synchronous data converter for interface with a GPS receiver, a minimum space keyed modem, and a continuous tone controlled sub-audible squelch controller that modulates a radio transceiver interface with a discrete tone such that both voice and data may share a common radio channel. The data/voice modem periodically keys-up the radio transmitter through its interface and transmits a packet of information that contains user position and velocity obtained through the GPS transceiver interface and adds a user identification code and time tag. Incoming message packets from the radio transceiver that are sent from other similarly equipped mobile units are used to supply individual network member absolute positions and velocities, and this information is stored by user identification number as goal or waypoint equivalents. As such, distance-to-goal, estimated-time-of-arrival and velocity-made-good estimates are made available on a target track screen included in the respective GPS receiver.

6 Claims, 1 Drawing Sheet

PORTABLE PERSONAL NAVIGATION TRACKING SYSTEM

BACKGROUND OF THE INVENTION

1. Field of the Invention

The invention relates generally to navigation equipment and more specifically to adapting global positioning system receivers with data/voice modems to standard radio communication transceivers over a single radio frequency link.

2. Description of the Prior Art

Global positioning system (GPS) receivers typically indicate only the navigational position of the receiver itself. In certain group settings where the positions of various remote or mobile stations needs to be known, such positions are commonly reported periodically by voice over a radio channel.

Many business, technical and military organizations could benefit from an automatic method of collecting the position of each individual remote station and any base station and by the distributing of such meter network positions to all. For example, public safety would benefit if police and fire dispatchers were equipped with GPS receiver base stations that could receive the current positions periodically of squad cars and fire engines. Other dispatching functions, such as parcel pickup and delivery could also better coordinate their assets and service where the location of mobile units were readily available.

A large installed base of very high frequency (VHF) and ultra high frequency (UHF) radio transceivers exists that can be economically employed to communicate GPS position data between mobile and base units. The range of VHF/UHF communication generally extends 5–50 miles, and up to 250 miles through the use of ground repeaters with a continuous tone controlled sub-audible squelch function. Such transceivers are generally equipped with push-to-talk PTT microphone inputs and auxiliary speaker outputs. These inputs and outputs are available for users to plug in various accessories and are easy to use. It would be advantageous to users, such as police and fire fighting organizations, to be able to use their existing mobile communications equipment and systems in a networked GPS receiver configuration.

SUMMARY OF THE PRESENT INVENTION

It is therefore an object of the present invention to provide a GPS network in which individual GPS receivers communicate their respective absolute positions to other units in the network or to a command base station.

It is another object of the present invention to provide a GPS receiver that reports its position automatically via a radio link to other GPS receivers.

It is a further object of the present invention to provide a data/voice modem to interface a portable GPS receiver to a standard VHF/UHF communication transceiver.

Briefly, a data/voice modem embodiment of the present invention comprises an asynchronous-to-synchronous data converter for interface with a GPS receiver, a minimum space keyed modem, and a continuous tone controlled sub-audible squelch controller that modulates a radio transceiver interface with a discrete tone such that both voice and data may share a common radio channel or radio repeater network. The data/voice modem periodically keys-up the radio transmitter through its interface and transmits a packet of information that contains user absolute position, velocity and bearing obtained through the GPS transceiver interface and adds a user identification code and time tag. Incoming message packets from the mobile radio transceiver that are sent from other similarly equipped mobile units are used to supply individual network member absolute positions, velocities and bearings, and this information is stored by user identification number as goal or waypoint equivalents. As such, distance-to-goal, estimated-time-of-arrival and velocity-made-good estimates are made available on a target track screen included in the respective GPS receiver.

An advantage of the present invention is that a GPS receiver is provided that communicates its absolute position out over a data/voice channel for use by other stations.

These and other objects and advantages of the present invention will no doubt become obvious to those of ordinary skill in the art after having read the following detailed description of the preferred embodiment which is illustrated in the drawing FIGURES.

IN THE DRAWINGS

DETAILED DESCRIPTION OF THE PREFERRED EMBODIMENT

Figure 1:
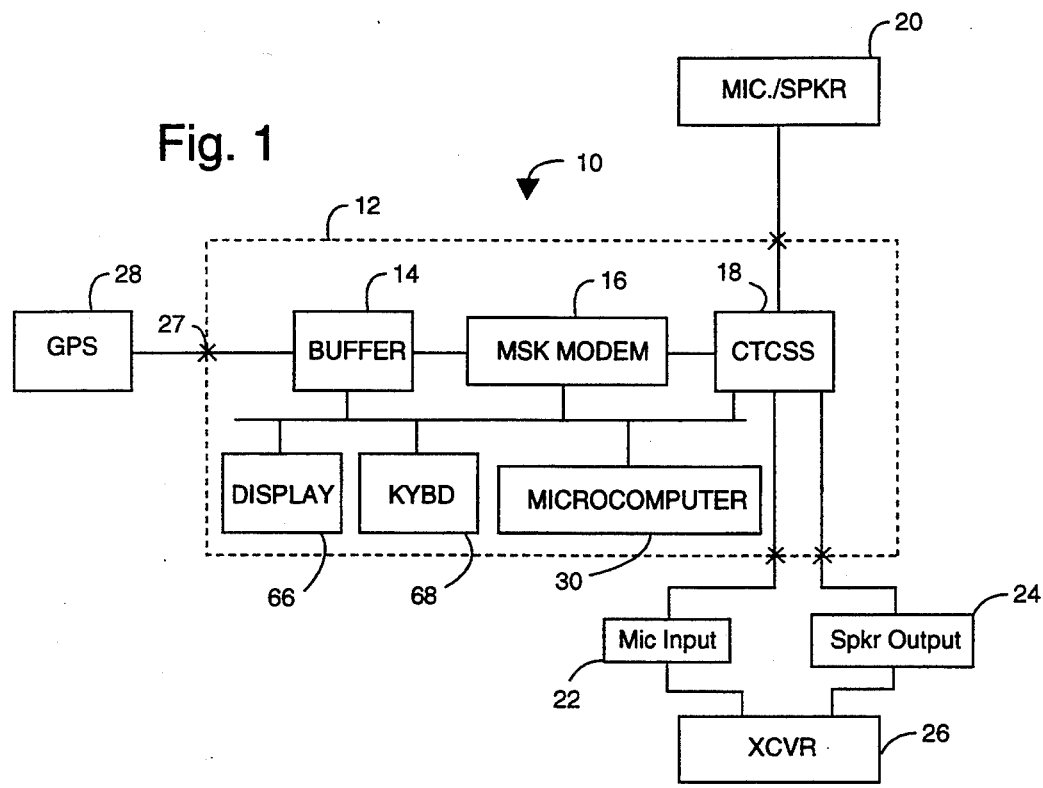
FIG. 1 is a block diagram of a GPS receiver system embodiment of the present invention.

FIG. 1 illustrates a global positioning system (GPS) system embodiment of the present invention, referred to herein by the general reference numeral 10. A data/voice modem (DVM) 12 comprises an asynchronous-to-synchronous data buffer 14, a minimum space keyed (MSK) modem 16, and a continuous tone controlled sub-audible squelch (CTCSS) controller 18 and a microphone (MIC)/speaker (SPKR) combination 20. A microphone input 22 and a speaker output 24 provide an interface to a VHF portable transceiver (XCVR) 26. Transceiver 26 is used by system 10 to carry a discrete tone such that both voice and data may share a common radio channel or repeater network. For example, transceiver 26 may comprise a commercially available unit, such as the M-11 marketed by ICOM Communications.

The microphone input 22 and speaker output 24 connect directly to transceiver 26, preferably at its respective microphone input and speaker output plugs. Such plugs are ubiquitous in general portable transceiver equipment.

A data input/output (I/O) port 27 allows for a two-way data connection with a GPS receiver 28. A commercially available GPS receiver that can be used as a basis for GPS receiver 28 is marketed as the SCOUT by Trimble Navigation (Sunnyvale, Calif.). A microcomputer 30, such as the 68000 marketed by Motorola (Phoenix, Ariz.), may be included in DVM 12 to generate and recognize alphanumeric user ID codes, to frame and de-frame message packets shipping out and coming in, and to message protocol and error detection and correction for message frames. Alternatively, GPS receiver 28 preferably provides such functions to reduce the hardware required by DVM 12 and its complexity.

The separate microphone/speaker combination 20 connected to CTCSS controller 18 allows user voice communication over the transceiver 26 to other such transceivers on the same radio channel, making the presence of DVM 12 transparent in such cases.

Transceiver 26 preferably has a push-to-talk (PTT) feature that will allow DVM 12 to key up the transmitter function and transmit a packet of information that contains user absolute position and velocity obtained through the GPS transceiver interface port 27 and adds a user identification (ID) code and time tag. (Absolute position is expressed in earth-centered, earth-fixed [ECEF] format.)

Absolute positions may either be updated by polling any mobile receivers automatically from a command base station, or by continuously monitoring any mobile GPS receivers (one to five seconds) for eventual use in display from a map database, e.g., in topographic or metropolitan street formats. To archive such data, the absolute positions with time tags can be stored in a database.

Figure 2:
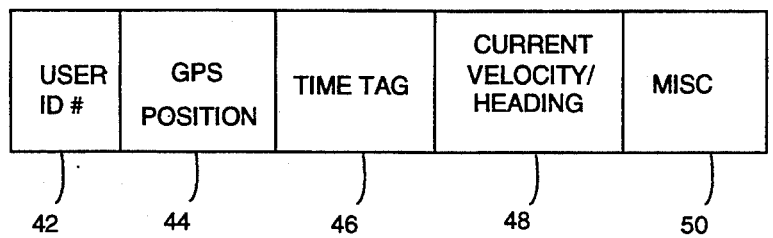
FIG. 2 is a diagram of a message frame communicated by the system of FIG. 1.

An exemplary message frame 40 is illustrated in FIG. 2, and comprises 400 bits of data that are divided into several fields. Other frame lengths are possible, nevertheless, a 400-bit frame sent at 1200 baud has given good results. Message frames 40 are both generated by GPS receiver 28 and received by input/output port 27. DVM 12 both combines and separates message frames 40 from the voice traffic over transceiver 26. A user ID field 42 uniquely identifies system 10 alphanumerically to other systems 10 that are within radio range of transceiver 26. A GPS position field 44 communicates the navigation position fix information that has been determined by the GPS receiver 28 of the system 10 identified in field 42 for its current location. A time tag field 46 permits the information in field 44 to be dated and thus coordinated when in receipt by other systems 10. A field 48 communicates the current velocity and heading of the system 10 identified in field 42. Miscellaneous information, such as search and rescue team identification codes or authorizations may be communicated in a field 50.

Various conventional error-free protocols could be used in the system-to-system communication of message frames 40. However, a more simplified scheme is preferably employed in which redundant frames 40 are sent and then are compared on receipt. If a match is found between consecutive frames 40, the data within them is considered to be acceptable and will be processed within the GPS receiver 28 that is in receipt of the particular frames.

Incoming message packets from the radio transceiver that are sent from other similarly equipped mobile units are used to supply individual network member absolute positions and velocities, and this information is stored by user identification number as goal or waypoint equivalents. As such, distance-to-goal, estimated time-of-arrival and velocity-made-good estimates can be made available on a "target track screen" included in the respective GPS receiver 28.

The use of waypoints and goals in GPS systems is conventional, as are the methods and computer system techniques used to compute distance-to-goal, estimated-time-of-arrival and velocity-made-good estimates from a current GPS-determined absolute position and velocity to a waypoint or goal. Therefore, a detailed disclosure of such is unnecessary here. The present invention provides for the automatic input of network member absolute position, velocity and heading information and substitutes the traditional waypoint and goal positions with these data. As a consequence, the waypoints and goals representing other users in a network of systems 10 are dynamic and in need of periodic updating. Such updating is carried on in background by the CTCSS controller 18 (FIG. 1) and the other functions of DVM 12.

CTCSS controller 18 may include a commercially available device, such as the MX365A CTCSS encoder/decoder marketed by MX-COM, Inc. (Winston Salem, N.C.). Another acceptable CTCSS device is the AK2341 marketed by Asahi Kasei (Japan). With such devices, voice is shared on radio channels by multiplexing with a sub-audible CTCSS tone. This provides a means of directing messages among user groups licensed on the same radio frequency.

The MX365A CTCSS encoder/decoder modulates a transmitter with a discrete tone, taken from a field of thirty-nine in the range of 67-250 Hz, according to the Electronic Industries Association (EIA) 220-B Standard, plus 69.3 Hz and 97.4 Hz. Groups of radio receivers, segregated by common interest and assigned tone, demodulate the voice tone mixture so that the voice messages may be heard. The MX365A CTCSS encoder/decoder enhances voice/tone multiplexing with on-chip filtering that attenuates transmitted speech by thirty-six decibels at 250 Hz, while passing signals under 300 Hz with only ±1 decibels of ripple. The AK2341 is a semiconductor chip that supports the EIA RS-220A Standard. One out of fifty frequencies between 67-254.1 Hz can be selected and that tone can be sent simultaneously with voice communication during transmission. By making the audio circuits sensitive to only a tone at the selected frequency, it is possible to conduct multiple communications on the same wireless Channel. A built-in tone signal filter is included and can be used to prevent tone leakage into the voice signal during reception and CTCSS malfunction caused by the voice traffic.

MSK modem 16 may comprise a single-chip device, such as the AK2353 marketed by Asahi Kasei (Japan). The AK2353 is an integrated baseband large scale integration (LSI) device intended for cordless phone sets. It includes both voice band filters and a 2400 BPS MSK modem for data communication and a compander for noise reduction. A data HIGH is represented by 1.2K Hz and a data LOW is represented by 2.4K Hz. A pre-emphasis and a de-emphasis circuit are included in the AK2353 which are preferably used between the CTCSS controller 18 and microphone/speaker combination 46 to improve voice quality. Otherwise, a separate pre-emphasis and de-emphasis circuit would have to be incorporated within DVM 12 to provide the voice quality improvement function. Pre-emphasis causes the higher frequency components in transmitted voice to be emphasized in order to improve the signal-to-noise performance of the modulated signal. De-emphasis then attenuates both the higher frequencies and noise, and returns the frequency response to near normal for natural sounding voice tones. Pre-emphasis and de-emphasis may be omitted, but the consequences may be unacceptable for particular users.

A lesser preferred commercially available MSK modem for use as MASK modem 16 is marketed as the MX439 by MX-COM, Inc. (Winston-Salem, N.C.). It is lesser preferred because it lacks pre-emphasis and de-emphasis circuits. The MX439 is a single-chip CMOS LSI circuit which operates as a 1200 baud MSK modem. The mark and space frequencies are 1200 Hz and 1800 Hz phase continuous, with frequency transitions occurring at the zero-crossing points. The transmitter and receiver are independent, thus providing full-duplex operation. The baud rate, transmit mark and space frequencies and the transmit and receive synchronization are all derived from a stable crystal oscillator included. The on-chip oscillator can operate at one of two frequencies, 1.008M Hz or 4.032M Hz, and is pin selectable with a clock rate logic input pin. Circuitry is included for carrier detect and receiver clock recovery. An on-board switched capacitor provides 900–2100 Hz bandpass filtering for the carrier.

Data buffer 14 may comprise a single-chip device, such as the XR-2135 marketed by EXAR Corporation (Sunnyvale, Calif.). The XR-2135 is a Bell/CCITT data buffer designed for modem data buffering at rates up to 19.2K BPS. Separate enable/disable inputs are provided for "async-to-sync" and "sync-to-async" converter sections. The receive data buffer section, sync-to-async, accepts input sync data typically from a modem demodulator and converts it to async format. The transmit data buffer, async-to-sync, accepts input data in an async format with a selected data rate of +1% to −2.5% and synchronizes it to a selected data rate and then sends the data to the modulator of the modem.

Transceiver 26 need not necessarily be a VHF/UHF portable radio. Cellular phones and other radio services may be used too, for example, low wave communication at less than 500K Hz. Various otherwise obsolete Coast Guard radio services may be used to support such system-to-system communication to support a network amongst systems 10.

Figure 3:
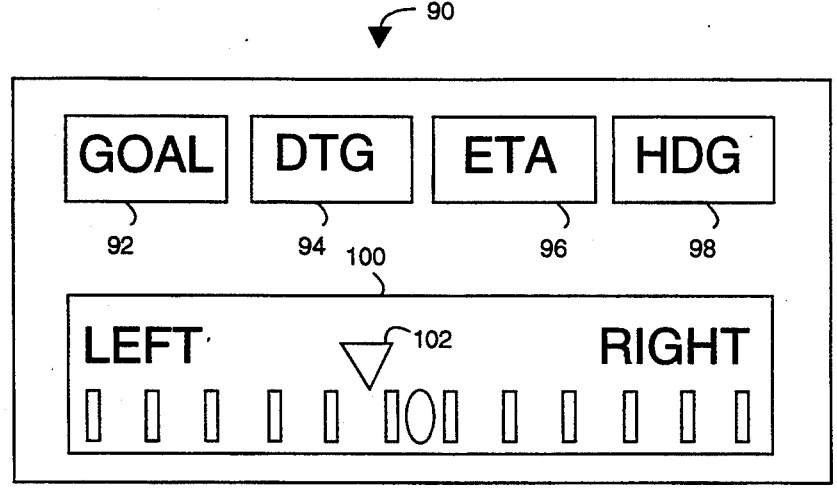
FIG. 3 illustrates a target track screen that may be represented on display included in the system of FIG. 1.

FIG. 3 illustrates a target track screen 90 that may be represented on a display 66 (FIG. 1). The screen 90 is divided into sections. A section 92 is used to display a goal identification code, such as a user ID. A section 94 is used to display an estimated distance to goal (DTG) or a waypoint that has been selected by manipulating the keyboard 68 (FIG. 1). Such a waypoint may, in fact, be the position of another system 10 as communicated by radio link over transceivers 26. A section 96 is used to display an estimated time of arrival (ETA) of the user to the selected waypoint, given the velocity and heading of both the systems 10 involved. A section 98 is used to display the heading to the goal. A gauge 100 is used to display the relative magnitude of left or right correctional heading change necessary for a user to converge on the selected goal. A cursor 102 moves left or right to indicate the required heading change to converge on the selected goal.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver system for use in a network of mobile users equipped with similar receiver systems, comprising:

a GPS receiver having an output port for communicating out a series of current position fixes and an input port for accepting as individual waypoints a plurality of position fixes determined by a plurality of remote GPS receiver systems;

voice communications means connected to said input and output ports of the GPS receiver and a microphone and speaker combination and a radio transceiver microphone input plug and a radio transceiver speaker output plug for automatically receiving and sending data messages that represent said position fixes of the GPS receiver and said remote GPS receiver systems transparent to a user such that ordinary voice communication between users of said remote GPS receiver systems are not prohibited; and waypoint substitution and selection means connected between the GPS receiver and the voice communication means and having a user display connected to the GPS receiver for indicating at least a relative heading to a selected one of said remote GPS receiver systems, and means for directing said current position fixes from said output port of the GPS receiver for transmission out by the voice communication means, and further including means for directing current position fixes received by the voice communication means from other of said remote GPS receiver systems to said input port of the GPS receiver.

2. The system of claim 1, wherein:
the voice communications means includes a continuous tone controlled sub-audible squelch (CTCSS) device that modulates and demodulates a tone carrier for transfer between said input and output ports of the GPS receiver and a radio transceiver with or without a radio repeater.

3. The system of claim 2, wherein:
the communications means further includes a data buffer connected to said input and output ports of the GPS receiver for asynchronous-to-synchronous and synchronous-to-asynchronous conversion between said input and output ports of the GPS receiver and said CTCSS device.

4. The system of claim 3, wherein:
the voice communications means further includes a minimum space keyed (MSK) modem connected between said data buffer and said CTCSS device for converting digital tone to audio tones and vice versa.

5. A data/voice modem (DVM) for coupling a local global positioning system (GPS) receiver to a local radio transceiver such that a network of mobile units or fixed and mobile units can automatically and mutually track one another's position as selected waypoints or goal destinations, comprising:

an asynchronous data port for connection to said local GPS receiver and for accepting local GPS position fixes and for supplying remote unit GPS position fixes to and from said local GPS receiver;

a data buffer connected to the asynchronous data port for asynchronous-to-synchronous and synchronous-to-asynchronous conversion of data;

a minimum space keyed (MSK) modem connected to the data buffer for synchronous data communication;

a continuous tone controlled sub-audible squelch (CTCSS) device connected to the MSK modem for modulating and demodulating a tone carrier such that simultaneous data and voice traffic are conveyed over radio links to and from a plurality of said units that are remote from said local radio transceiver; and a first speaker and microphone port connected to the CTCSS device for connection to said local transceiver and providing for data received at the asynchronous data port to be transmitted by radio and providing for data received by radio to be demodulated and converted for output at the asynchronous data port.

6. The DVM of claim 5, further comprising:
a second speaker and microphone port connected to the CTCSS device and providing for connection to an external speaker and an external microphone for voice communication via said local radio transceiver.

* * * * *